United States Patent [19]

English, Jr.

[11] 4,351,870
[45] Sep. 28, 1982

[54] MAXIMIZED STRENGTH-TO-WEIGHT RATIO PANEL MATERIAL

[76] Inventor: Edgar English, Jr., 45125 Redwood Ave., Lancaster, Calif. 93534

[21] Appl. No.: 86,748

[22] Filed: Oct. 22, 1979

[51] Int. Cl.³ .................. B32B 3/02; B32B 7/04; E04B 2/00
[52] U.S. Cl. ................. 428/174; 52/232; 52/309.6; 52/309.7; 52/309.16; 428/182; 428/186; 428/304.4; 428/318.4; 428/921
[58] Field of Search ............... 428/314.4; 428/182, 428/184, 185, 186, 310, 313, 315, 920, 921; 156/210; 106/18.24; 52/232, 309.7, 309.6, 309.16, 795, 798, 799, 800

[56] References Cited

U.S. PATENT DOCUMENTS

| | | | |
|---|---|---|---|
| 3,542,636 | 11/1970 | Wandel | 428/921 |
| 3,583,123 | 6/1971 | Holmgren et al. | 52/795 |
| 3,741,857 | 6/1973 | Kakutani et al. | 156/210 |
| 3,830,886 | 8/1974 | Davis et al. | 428/921 |
| 3,950,910 | 4/1976 | Pobantz | 52/798 |

FOREIGN PATENT DOCUMENTS

1499168  1/1978  United Kingdom ............. 428/921

*Primary Examiner*—Paul J. Thibodeau

[57] ABSTRACT

The invention relates to panelling material which may be of a decorative or structural type, or both, and which has a very large magnitude strength-to-weight ratio and which is ideally suited for and in certain forms is embodied in, pattern-pre-cut multiple panels adapted to be quickly and easily assembled and edge-fastened together to form a desired building structure and which, because of its inherent flexibility, will provide an extremely earthquake-resistant structure, whether in a low-rise, moderately reinforced structure or in a high-rise, extensively reinforced structure in a manner which will allow the entire structure to flex and move as a unit, thereby virtually eliminating all tendency to separation of different structural materials during even extreme earthquake-caused flexing movements of the structure. The panelling material includes combustion-inhibiting or fire-extinguishing material carried adjacent to or in a disseminated relationship therethrough and taking the form of particles which in one form are preferably of a heat-responsive nature adapted to decompose when subjected to the heat of combustion and to produce, as a result of such decomposition, an effectively built-in fire-extinguishing gas, usually a halogen and, in a preferred form, a halogen containing a substantial quantity of bromine and adapted to prevent the maintainance of combustion originating from other adjacent structures or materials or sources or to substantially inhibit same and to virtually completely prevent the self-supporting maintainance of combustion of the panelling material.

19 Claims, 24 Drawing Figures

MAXIMIZED STRENGTH-TO-WEIGHT RATIO PANEL MATERIAL

BACKGROUND OF THE INVENTION

Various types of low-density materials have been employed in connection with structural materials, usually structural materials of a hollow type which may be partially or fully filled with such a low-density filler material for the purpose of reducing the overall weight of the combination and also for enhancing the thermal-insulating and/or acoustical insulating characteristics thereof. However, the use of laminated, low-density high-specific volume filler material in joined relationship to one or more convoluted weight-reducing, strength-increasing stiffening layers of structural formed material whereby to provide an effectively unitary high strength-to-weight ratio, structural panelling material has not been carried to its ultimate optimum in the past and certainly has not been provided with effectively built-in fire extinguishing means capable of preventing self-sustained or self-supporting combustion and of either preventing or greatly inhibiting combustion of such structural panelling material from combustion initiated, supported, and/or maintained by substantially more combustible adjacent materials or sources.

Thus, it is clear that the provision of such an effectively unitary high strength-to-weight ratio structural panelling material, including high strength corrugated stiffening portions and lower strength extremely low-density, high-specific volume filler material intimately fastened together in an area-coextensive manner and provided with built-in fire extinguishing means would be extremely desirable and it is precisely such a highly-desirable and advantageous type of structural panelling material which is provided by and in the present invention and which has major advantages completely overcoming prior art disadvantages and limitations (such as ready combustibility, the extremely exothermic nature of such combustion when started, and the production of extremely toxic gasses from such combustion of prior art filler foam plastic materials), and all of which advantages flow from and occur by reason of the specific features of the invention hereinafter.

SUMMARY OF THE INVENTION

Generally speaking, the novel panelling material of the present invention comprises one or more layers or laminations with at least certain of same comprising strength-increasing layers of laminated panelling means interspersed or separated by lower strength primarily bulk-producing layers of the composite laminated panelling means and which may comprise foamed plastic or foam rubber materials and, in certain cases, may be provided with substantial quantities of filler material. The strength-increasing layer or layers of the laminated panelling means may comprise convoluted layers of high strength plastic resin material or in certain cases metallic material, while the intermediate bulk-producing layers may comprise foamed plastic or rubber material such as expanded polystyrene foam, polyurethane foam, foam rubber, or the like, and the strength-producing layers may be convoluted or corrugated for the purpose of enhancing the strength-to-weight ratio of the composite panelling means, and all of said interfaces between adjacent layers of the laminated panelling means may be joined together cohesively by plastic adhesive, or cement means, suitable for the plastic material of which the particular joined adjacent layers are formed or, in the case of thermoplastic materials, may be heat-sealed or cohesively fastened together and, in certain other forms, may be mechanically fastened together along a plurality of interface junction means. Appropriate outer layers of the laminated panelling means may be of weather-proof or weather-resistant, fire-proof or fire-resistant material, or may bear various decorative finishes.

The panelling material includes combustion-inhibiting or fire-extinguishing material carried adjacent to the expanded foam material, or in disseminated relationship through the expanded foam material, and preferably taking the form of particles of a solid fire extinguishing agent of a heat-responsive type, such as a halogenated compound adapted to decompose when subjected to the heat of combustion and to produce, as a result of such decomposition, a fire-extinguishing gas or vapor either contiguous to or within the expanded foam material and, in a preferred form, comprising a halogen gas or vapor preferably containing a substantial quantity of bromine and thus being adapted to prevent the maintainance of combustion originating from other adjacent or nearby structures or materials of a more combustible nature or to at least substantially inhibit same while at the same time, being adapted to virtually completely prevent the self-supporting maintainance of combustion of the structural panelling material itself and of the expanded foam constituent thereof and to thus prevent both the high-level production of heat characteristic of the combustion of such expanded foam materials and also to prevent or greatly minimize the production of any by-product toxic gasses arising from the combustion of or excessive heating of such expanded plastic foam materials.

The entire multi-layer, high strength-to-weight ratio laminated panelling means may be produced by a lamination and/or convoluting process of a continuous flow nature, thereby producing relatively inexpensive high-strength laminated panelling material of virtually any desired size, as determined by the width formed during the laminating process and the length of a formed sheet before it is cut off. This type of forming process also lends itself well to the forming of various differently shaped objects of the laminated panelling means, such as various types of protective packaging means, etc.

The basic generic aspect of the present invention is a panelling material taking the form of laminated panelling means including a plurality of panelling material layers firmly and effectively bonded together at a plurality of area-spaced and area-disseminated, multi-point, interface attachment and junction locations, each of which comprises what might be termed an interface junction means. The plurality of interface junction means are spaced over the area coextensive with the laminated panelling means (or the plurality of panelling material layers thereof) and with said plurality of layers of the laminated panelling means including at least one convoluted weight-reducing and strength-increasing layer of structural formed material having a plurality of convolutions extending transversely (or outwardly) from a surface plane thereof and, in one preferred form, in opposite directions and from opposite surface planes thereof. The convolutions of the strength-increasing layer have outer extreme contact portions (which may take the form of contact ridge portions, contact point portions, contact area portions of any end view shape)

generally lying in one or the other (or both) of two oppositely spacedly positioned (and usually similarly symmetrically positioned with respect to an intermediate contral plane transversely spaced contact planes, either one or each of which is in contact with a corresponding surface portion of a corresponding next adjacent layer of the laminated panelling means and effectively provided with and defining the previously mentioned plurality of interface junction means.

In one form of the invention, the above-mentioned strength-increasing layer may comprise an inner or intermediate layer having at least a pair of oppositely positioned outer layers of said panelling means positioned on opposite sides thereof and effectively firmly bonded thereto by a plurality of said interface junction means, and in this form of the invention one or the other or both of the outer layers of said laminated panelling means may be made of an effectively compressible shock-absorbing material which, in certain cases, may also be a sound absorptive and deadening material and, in certain cases, may be a thermal insulating material, although not limited to this particular combination of functional features, any of which may be independently present rather than in combination in certain forms of the invention. One or the other of said outer effectively compressible layers of the laminated panelling means may be made of an expanded body of elastomeric plastic or rubber-like material defining and surrounding a plurality of hollow cells (which, in certain forms, may be of the communicating cell type and in other forms may be of the isolated, non-communicating cell type.) This expanded cellular type of outer panelling means layer material may be termed form material and will cause the complete laminated panelling means to thus provide a maximum volume-to-weight ratio and desired compression and/or hysteretic loss characteristics (the latter being present primarily in the communicating cell type of foam material.)

It should also be noted that in certain other forms of the invention the strength-increasing layer of panelling material of the laminated panelling means may take the form of more than one layer and/or may be positioned at a location other than at an inner or intermediate location, and such a positional modification is also possible with respect to one or more of the other lamination layers, such as one or more layers of the above-mentioned type of foam material—the positioning of the different types of lamination material layers of the number of such layers being dictated by the physical requirements of the use to which the laminated panelling means is to be put, as to surface compressibility for protection and non-marring purposes or the like (or the lack thereof), as to the overall strength required of the composite laminated panelling means, as to the overall strength-to-weight ratio required of the laminated panelling means, as to the required shock isolation characteristics of the laminated panelling means, as to the vibration and/or every loss requirements (produced primarily by hysteretic losses in the connected cell type of foam material), as to the sound-deadening requirements of the laminated panelling means, and other similar requirements, which may change substantially for different usages of the laminated panelling means.

The panelling means may even include, in certain forms thereof, metal as the strength-increasing layer, with various types of other materials comprising the other layers bonded thereof. In some cases, a sandwich type construction may be employed wherein a relatively inexpensive (and usually low density) filler material comprises an intermediate or intervening layer (or plurality of such layers, each) between at least two other layers laminated on outer surfaces thereof so as to contain such relatively inexpensive and usually relatively lightweight intermediate filler material which, in some cases, may comprise waste fibrous material, waste cellulosic material, material such as nutshells, sawdust, and the like, which can be bound together in an appropriate binding matrix material, such as any of a plurality of different plastic resins, of either a synthetic or natural type; for example, including lignin or any other functional equivalent thereof. This type of intervening layer will give bulk to the laminated panelling means and will improve its structural characteristics while maintaining an extremely low overall density factor, thus improving the strength-to-weight characteristics thereof.

In certain forms of the invention, the above-mentioned interface junction means may comprise thermal and/or pressure induced cohesive bonds between adjacent portions of the plurality of layers of the laminated panelling means produced by the application of appropriate heat and pressure to the assembly of layers of the panelling means by appropriate continuous-flow action pressure roller means adapted to apply pressure to one or more of the non-corrugated layers of the panelling material while in contact with the corrugations (either previously produced or substantially simultaneously produced) in one or more of such strength-increasing layers. This, of course, effectively applies heat and pressure at a plurality of area-spaced and area-disseminated, multi-point interface attachment junctions between the adjacent non-corrugated and corrugated laminated panelling means layers. This particular type of construction and mode of manufacture of the laminated panelling means is highly desirable since it makes it possible to produce the laminated panelling means in the form of a continuous strip, belt, or web, which is conducive to cost minimization per area unit of laminated panelling means so produced. Such laminated panelling means may then be appropriately provided, dispensed, or sold in sheet or panel form for subsequent forming operations to form a great variety of different structures or objects in conventional forming machines, apparatus, and dies, and in accordance with substantially conventional forming practice. This may be easily done where the laminated panelling means is of a thermoplastic nature and may also be done when the laminated panelling means is of a material initially functionally thermoplastic but adapted either during or after such a forming operation, to be effectively modified, perhaps by the addition of a catalyst or other curing agent or by subjecting it to a condition bringing about the same result, so that the formed laminated sheet of panelling means material effectively cures or sets in what might be termed an effective thermosetting manner in the desired shaped or formed configuration.

It should be noted that, generally speaking, the convolutions of the strength-increasing layer of the laminated panelling means will be sufficiently strong to substantially preserve the integrity thereof during a forming operation of the type mentioned immediately above, at least to a substantial degree. However, if an even greater degree of retention of the full extent of convolution projection is desired, it is possible to perform the forming operation producing the ultimate shape of the desired object which is to be made out of the laminated panelling means while, at the same time, or substantially the same time, producing the actual junction of the various layers of the laminated panelling means to each other in the manner briefly described hereinbefore.

It should also be noted that, in a preferred form of the invention, the strength-increasing layer may have the plurality of convolutions formed therein in the same machine as that previously described for the purpose of effectively fastening together and joining the various layers of the laminated material to each other. This can be readily accomplished by passing the strength-increasing layer of material through a pair of die-equipped rollers which will subsequently form the strength-increasing layer into the desired convoluted configuration, followed almost immediately by the joining therewith of one or more (usually at least two) other layers of the laminated panelling means, such as foam material of the type previously mentioned, although not specifically so limited, as they pass through an immediately adjacent pair of heated, joining rollers of the type previously mentioned for effectively laminating all of the layers of panelling material of the laminated panelling means together at said plurality of area-spaced and area-disseminated, multi-point interface attachment and junction locations whereby to form a plurality of the previously mentioned type of interface junction means.

While one exemplary type of joining operation has been described hereinbefore as being based upon heat and pressure, it should be noted that the invention is not specifically so limited and the multiple layers of the laminated panelling means may be joined together by means other than heat, such as solvent which effectively softens one or the other (or both) of two adjacent lamination layers so that pressure applied thereto will cause a cohesive bond therebetween or such as by providing for the intermittent positioning between the layers of the adjacent lamination material of suitable adhesive means which will be pressed together by the pressure of the joining rolls so as to cause adhesive bonds between adjacent portions of the plurality of interface junction means of the laminated panelling means. The adhesive joining means interpositioned between contacting adjacent portions of the plurality of layers of said laminated panelling means may be of any of a variety of types, such as thermoplastic adhesive, thermosetting plastic adhesive, solvent-carried adhesive adapted to harden and set in place as a result of the evaporation of the solvent, or any other type of suitable adhesive means. Indeed, mechanical bond means may be provided and effectively applied by joining means at the appropriate times and locations as the plurality of adjacent layers of lamination material pass therethrough. All of these types of joining means are illustrative only and are not intended to specifically limit the invention thereto.

While the laminated panelling means of the present invention may be employed for a variety of different structural and/or decorative purposes, attention is directed to the fact that it is well adapted for use in the building industry—that is, for building various different kinds of structures, such as homes, offices, buildings, factories, and the like. The panelling means portions may take the form of a plurality of individual panels, preferably pre-cut to size in accordance with a predetermined pattern and adapted, when assembled and mounted in a predetermined relationship with respect to each other, to define a building structure of a predetermined plan, pattern, or shape. This would make it possible to construct a home in a matter of hours, or at the most, several days rather than weeks, as is the customary practice by the handcraft method employed generally in building individual homes.

For example, if all of the panels are initially pre-cut to size at the factory and are supplied to the builder in such pre-cut-to-size condition, along with the appropriate programming coding or information such that the builder will know how to quickly and easily assemble the plurality of panels at the building site, it will be possible to do this with respect to the foundation and basic frame structure of the building in a very simple, quick, and easy manner. The individual panels may be provided with effective edge-joining, mounting, and assembling means of an interlock type, of a channelar receiver type, or any other suitable type for facilitating the mounting, assembling, and placing of the plurality of panels in the desired predetermined relationship at a building site or location so that the entire building or home can be easily and quickly erected with very little cutting or reshaping of the panels being required to achieve this.

In certain cases, the so-called edge-joining and mounting and assembling means may merely comprise edge portions adapted to be fastened to each other or to appropriate studs (or other structural or support members) of the building frame structure, or the like, by any suitable fastening means, such as mechanical fasteners (including, but not limited to, nails, screws, staples, and the like), adhesive or cohesive fastening means, or any other suitable means for fastening each of the panels in the proper location with respect to the building frame structure, and all such means are intended to be included and comprehended within the broad scope of the present invention.

In certain forms of the invention, entire wall sections may be made of a large sheet of the laminated panelling means of the present invention, fastened together only at room corner portions or the like.

All that has been said above is equally applicable with respect to floor and ceiling panels and is additionally applicable to inside surfaces or outside surfaces of a home or other building. Of course, when the laminated panelling means of the present invention is used to provide an inside wall surface of a home or building, it may be provided with appropriate, and usually decorative, inwardly facing surface means to provide any desired type of room wall surface, such as wood veneer; plastic simulated wood veneer; wallpaper finish or simulated wallpaper finish; plaster finish or simulated plaster finish; a tile surface or a simulated tile surface; a brick surface or a simulated brick surface; or virtually any other type of appearance, wear and cleanability characteristics which the builder or prospective home owner desires. Indeed, this form of the present invention lends itself very readily to providing a virtually lifetime maintenance-free wall surface requiring no repair and very little cleaning.

All that has been said above is equally applicable with respect to the laminated panelling means of the present invention when employed as an outer wall surface of a house or building—that is, it may be provided with an outer surface having desired weatherproofing, long-wearing, maintenance-free, and/or decorative characteristics, as specified by the builder or prospective home owner. In other words, the outer surface of the laminated panelling means may comprise a completely moisture-impervious coating of a non-oxidizing, non-flaking type, similar to anodized aluminum or baked-on enamel, or the like, and which may be colored (either solid colored or colored in desired patterns) to provide any type of desired external appearance.

It should also be noted that the panelling means of the present invention, when employed for building purposes, as referred to above, is not limited to functioning as an inner or outer wall panel for decorative or weatherproofing purposes, but also may function as a structural member comprising part of the load-supporting structure of the building because of the high strength-to-weight ratio of the novel panelling means of the present invention.

The novel panelling means of the present invention, when employed for building purposes, has another major advantage over many conventional materials and modes of building construction in that the panelling material of the present invention is relatively laterally deflectable and, therefore, has an effective modulus of elasticity in a lateral bending mode substantially less than any of the conventional well-known reinforcing materials or structural materials of which frames, or the like, may be made and adapted to carry the rest of the materials of which the building is constructed in predetermined relationship thereto. In this connection, it should be noted that this is an extremely important feature in providing an earthquake-resistant structure, since one of the major reasons for failure of conventional building construction to resist violent earthquakes is the fact that, in the case of low-rise buildings, they may be made of stucco, brick, concrete, or other relatively brittle and frangible materials which do not have much lateral compliance or flexibility and which, therefore, tend to fracture as a result of the great lateral movement imparted thereto during a major earthquake. In the case of buildings made of such relatively brittle and frangible materials but provided with steel reinforcing, or the like, it is still possible for large-scale damage to occur as a result of a major earthquake, largely because of substantial differences in the effective lateral compliance of the different materials. In other words, the relatively brittle, frangible, concrete, brick, stucco, or the like, portion of such a building structure has a substantially different lateral compliance than does the steel reinforcing members associated therewith, and during major lateral deflections of the building structure, this results in effective separation of said materials with the consequent partial or virtually complete collapse of major portions of the multi-phase material or of at least the brittle, frangible building material portions of which such a building is constructed.

On the contrary, with a low-rise building employing substantial amounts of the novel panelling material of the present invention, it will be found that it has a substantial degree of lateral compliance and virtually no brittleness or frangibility and thus a building structure can flex to whatever degree is adapted to be produced as a result of its being subjected to a major earthquake with virtually no damage to the structure occurring. It will merely flex and then return to its original configuration substantially without damage. In the case of a higher building, where moderate reinforcing may be provided, it will normally be found that the compliance of the novel panelling material of the present invention is such that it will flex exactly the amount required to maintain its physically-joined relationship to the reinforcing material, without any breakage or separation between the two different types of material occurring. This, of course permits the moderately reinforced type of building embodying a substantial amount of the panelling material of the present invention to flex very substantially and then return to its original position with virtually no cracking or damage occurring to any portion of the structure or of the panelling material.

In the case of what is commonly called a high-rise building which has major wall portions thereof formed of the novel panelling material of the present invention, substantially the same type of flexure along with the reinforcing or frame material as that mentioned above will occur, without any separation of the two different types of material being experienced. In certain cases where it is thought desirable, the degree of lateral compliance of the novel panelling material of the present invention, when employed in such high-rise building structures, may be modified as a function of height (by either changing the effective stiffness of the panelling material or its effective thickness) so as to provide optimum flexibility for the degree of lateral deflection and effective distortion expected to be experienced at that particular height of the high-rise building structure during a major earthquake.

It should also be noted that the hereinbefore-mentioned interface junction means between adjacent layers of the laminated panelling means may be produced in an extremely rapid, thorough, and complete manner through the use of laser means positioned adjacent to the several layers of panelling material prior to the effective laminating and bonding thereof, which will occur at all regions subjected to such a laser beam. It will readily be understood that this lends itself to making any desired pattern of interface junction means with respect to the complete area of the resultant laminated panelling material and, further, that this lends itself very well to the continuous flow of a multi-layer web of such panelling layers past such laser means, which may be appropriately moved relative to the layers of material so as to form a desired pattern of interface junction means in a continuousflow fashion which will greatly facilitate the rapid, and consequently inexpensive, manufacture of the laminated panelling material in the form of a sheet which may be cut off in various shapes and sizes and which may be then formed into any desired configurations while still retaining all of the advantages inherent in the construction and important features of the multi-layer laminated panelling material.

It should also be noted that in those aspects of the invention where the composite multi-layer panelling material is to be formed into structural building panels having a low overall density factor and a very high strength-to-weight characteristic, the material may be appropriately shaped for ready mounting and fastening with respect to conventional structural members of a building so that the conventional means for fastening panelling material of various types relative to inner structural members can be virtually completely eliminated by reason of the fitted and, in certain cases, interlocking characteristics of such structural panels of the present invention, both with respect to such building structural members and with respect to each other.

OBJECTS OF THE INVENTION

With the above points in mind, it is an object of the present invention to provide a novel article of manufacture and means embodying same, of the character referred to herein, generically and/or specifically, and which may include any or all of the features referred to herein, either individually or in combination, and which is of extremely simple, inexpensive, and easy-to-manufacture construction and, therefore, suitable for mass manufacturing and distribution in any of its various different aspects intended for any of its various different purposes or for any substantially equivalent or similar purposes.

Further objects are implicit in the detailed description which follows hereinafter (which is to be considered as exemplary of, but not specifically limiting, the present invention), and said objects will be apparent to persons skilled in the art after a careful study of the detailed description which follows.

For the purpose of clarifying the nature of the present invention, several exemplary embodiments of the invention are illustrated in the hereinbelow-described figures of the accompanying four sheets of drawings and are described in detail hereinafter.

BRIEF DESCRIPTION OF THE DRAWINGS

FIG. 21 is another view similar to both FIG. 19 and FIG. 20, but illustrates a further slight variation in the mode of inclusion of a combustion-inhibiting agent in another representative form thereof.

DESCRIPTION OF THE PREFERRED EMBODIMENTS

Figure 1:
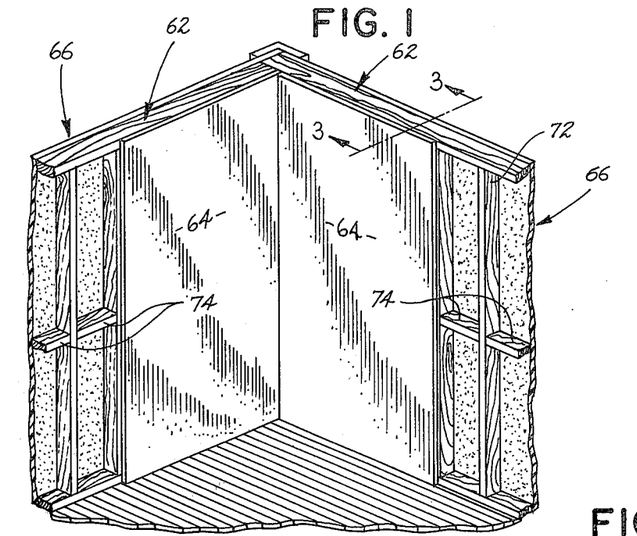
FIG. 1 is a greatly reduced-size, fragmentary, partly broken-away, perspective view showing an inside corner portion of a room of a building, such as a home, for example, although not specifically so limited, and with left and right portions of the two corner-defining walls and a corresponding portion of the floor being broken away for space-saving reasons and with the ceiling and roof structure not shown at all in order to maximize the clarity of the disclosure shown in FIG. 1, wherein novel building or structural panels formed of the laminated panelling material of the present invention in the form of pre-manufactured and pre-cut-to-size wall panels form the walls of the structure shown fragmentarily in FIG. 1.
Figures 2, 2A, 4, 4A:
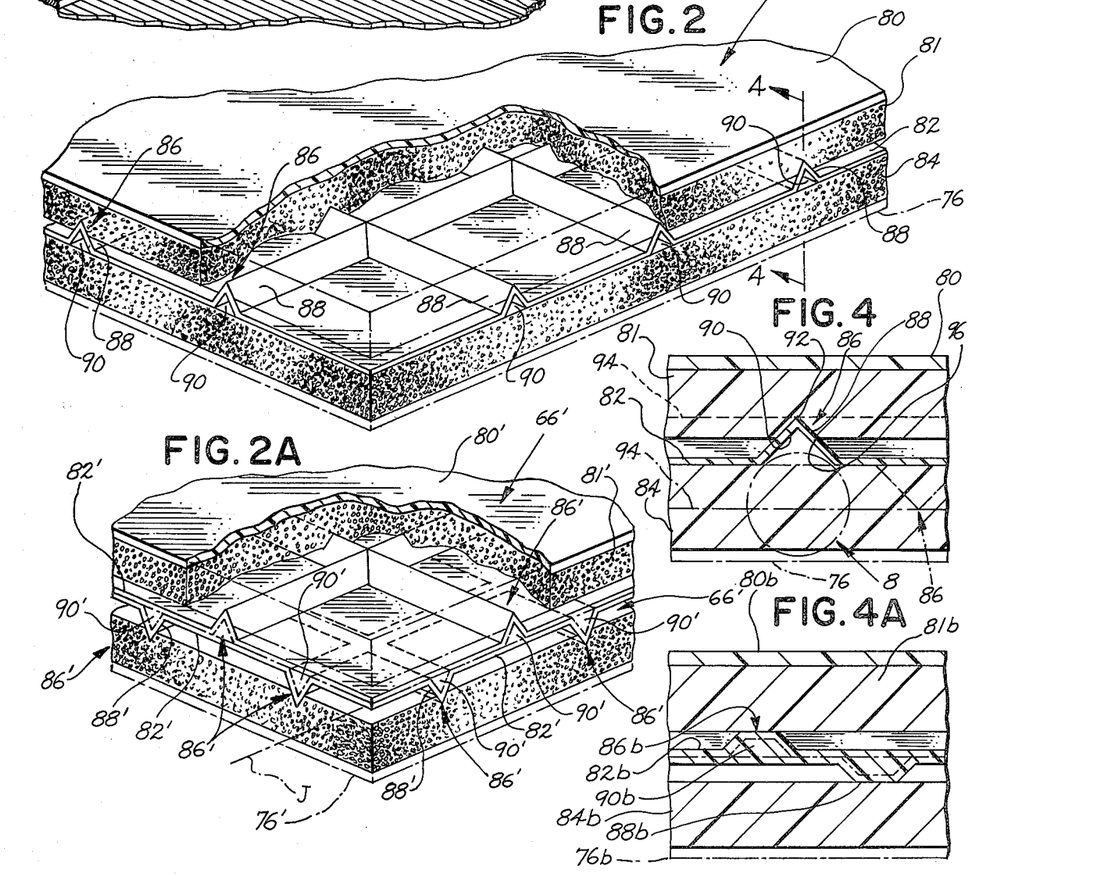
FIG. 2 is an enlarged, fragmentary, partly broken-away view illustrating a typical construction of the building structural panels employed in FIG. 1.
FIG. 2A is a fragmentary partly broken-away perspective view of aspect similar to FIG. 2 but illustrates a slight modification of intermediate stiffening sheet wherein it has similarly shaped convolution extending in both directions and is illustrated in solid lines as being made of molded or formed variable thickness construction and is shown in broken lines in an optional alternate form wherein it is made of two formed sheets joined together along a central junction plane and with each formed sheet having multiple similar convolutions extending in a direction opposite to the convolutions of the other formed sheet.
FIG. 4 is an even larger fragmentary, cross-sectional view taken substantially along the plane and in the direction indicated by the arrows 4—4 of FIG. 2.
FIG. 4A is a view similar to FIG. 4 but illustrates a slight modification of the stiffening corrugations or ribs formed in the stiffening sheet of material so as to provide a substantially flat bonding surface thereof, bonded to the adjacent layer of foam material and differing from the angular, partially penetrating type of stiffening rib or corrugation and its bonding to the adjacent layer of foam material as shown in FIG. 4.
Figure 3:
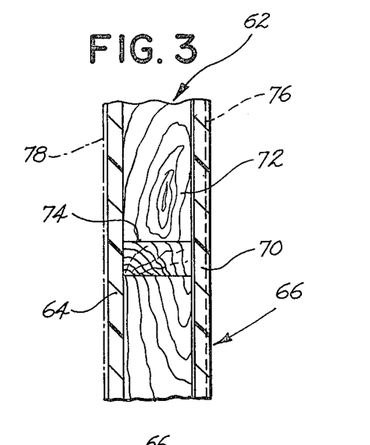
FIG. 3 is an enlarged, cross-sectional view taken substantially along the plane and in the direction indicated by the arrows 3—3 of FIG. 1 and shows the typical representative but non-specifically-limited mode of building construction employed in FIG. 1, it being understood that the composite multi-layer panelling material of the present invention may comprise either or both of the inner and outer walls shown fragmentarily in FIG. 3.

The exemplary first form of the invention shown in FIGS. 1-4 illustrates the article of manufacture of the present invention taking the form of decorative and structural panelling material having a high strength-to-weight ratio and comprising panelling for a building which, in the example illustrated in said figures, comprises a plurality of panelling means portions cut to size so that, when assembled and mounted in a predetermined relationship with respect to each other, a predetermined plurality of said panelling means portions define an inner wall or an outer wall (or both walls) of a building structure of a predetermined plan, pattern, and shape and, in certain cases, may even define structural members thereof. In said exemplary first form, two such panel means portions are clearly shown in FIG. 3 in edge-joined relationship such as to define an outer wall part of the complete wall, indicated at 62, of a building structure which is fragmentarily shown in FIG. 1. The wall 62 includes an inner wall portion 64 and the outer wall portion made up of the two panelling means portions 66 having one exemplary type of edge-joining mounting and assembling means such as indicated at 68, as best shown in FIG. 3, although not specifically so limited. In the example illustrated, the edge-joining mounting and assembling means 68 includes an interfitting flush type of joint 70 provided by having the corresponding inner and outer parts of the two panelling means portions 66 cut away in a mating and matching manner and with both of same being attached to the structural means supporting the building and, in the example illustrated, comprising the vertical members 72 and the lateral or horizontal members 74 which may comprise wooden 2×4's or any other suitable type of structural members forming the complete structural framework of the building.

The attachment and mounting part of the previously-mentioned edge-joining mounting and assembling means indicated generally at 68 may comprise adhesive fastening means or various types of mechanical fastening means or may comprise means physically interfitting with corresponding portions of the framework means, or any other substantial equivalents thereof.

In the exemplary first form of the invention, the inner wall 64 may also be constructed of similar panelling means portions, if desired, or may be of any conventional prior art type, and it, as well as the outer wall, may be provided with an appropriate coating or layer (inner coating or layer in the case of the inner wall or outer coating or layer in the case of the outer wall) to function as a protective and/or decorative coating. Such protective coatings are indicated in broken lines at 76 in the case of an outer coating and at 78 in the case of an inner coating and, in the case of the outer coating, may comprise a weatherproof coating, such as an acrylic resin outer coating, an enamelled outer coating, or other coating which is both weatherproof and extremely wear-resistant and capable of being colored virtually any desired color to provide a desired exterior decorative appearance. The inner coating 78 may be of the same type as the outer coating 76 although, since it does not have to be completely weatherproof, a wider range of materials may be employed for same. Also, in addition to the provision of colores within the inner coating 78 or the outer coating 76, it should be noted that patterns may be provided simulating wood veneer, brick or tile, wallpaper, or any other desired pattern in color or simulated texture, or any combination of same, in order to achieve the desired decorative appearance.

FIG. 2 illustrates in enlarged, broken-away, perspective form one exemplary version of the decorative and structural panelling material of the present invention, such as any of the building panel means portions 66 shown in FIGS. 1 and 3 and, in the exemplary form best shown in FIG. 2, it is illustrated as including a plurality of panelling material layers, such as the layers indicated at 80, 81, 82, 84, 76, which are firmly bonded together at a plurality of area-spaced, area-disseminated, multi-point interface attachment and junction locations such as indicated by the reference numeral 86 and each comprising an interface junction means 88, with said plurality of interface junction means 88 being spaced over the area coextensive with the laminated panelling means 66. In the example illustrated in FIGS. 2 and 4, the plurality of layers of the laminated panelling means or member 6 include at least one convoluted, weight-reducing, strength-increasing, stiffening layer of structural formed material having a plurality of convolutions extending transversely from a surface plane thereof and having outer extreme contact portions lying in a corresponding one of two oppositely symetrically positioned, spaced planes, each in contact with a corresponding inside surface portion of a corresponding, next outwardly adjacent layer of said laminated panelling means and effectively provided with and defining said plurality of interface junction means 88.

In the exemplary first form of the invention, the above-mentioned convoluted, weight-reducing, strength-increasing stiffening layer is the layer identified by the reference numeral 82 and the convolutions thereof are designated by the reference numeral 90. In the example illustrated, as best shown in FIG. 4, the outer extreme contact portions of the convolutions 90 are designated by the reference numeral 92 and lie in the two transversely spaced outer planes 94. However, it should be clearly noted that each angularly inclined outer surface of each convolution 90 in the exemplary first form of the invention is pressed into the adjacent layer 81 (and, also, 84) of foam material so as to be in contact with the corresponding angularly inclined inside surface portion 96 of said foam layer 81 (and, also, 84) and be effectively bonded thereto whereby to define the hereinbefore-mentioned plurality of interface junction means 88.

This is true with respect to both alternately oppositely directed convolutions 90 and with respect to both adjacent foam layers 81 and 84 which, in the example illustrated, may be made of foam plastic material, foam rubber material, or, indeed, any appropriate, relatively light-weight foam material having the desired structural, compressible, shock-absorbing, sound-deadening, and/or thermally insulating characteristics and, in certain cases, having certain desired hysteretic characteristics, also. For example, said foam layers 81 and 84 may be made of polyurethane foam, polyvinyl foam, polystyrene foam, or a variety of other appropriate low-cost, light-weight foam materials having the desired characteristics, and the bonding of the convolutions 90 to said foam layers 81 and 84 to produce the interface junction means 88 may be provided in a continuous-flow process of the type illustrated in FIGS. 17 and 18, and described hereinafter or in a variety of other ways which may provide thermal and/or pressure induced bonds, or adhesive or cohesive bonds, between adjacent portions of the plurality of layers 81, 82, and 84 (indeed, any of the layers of an assembled, superimposed plurality thereof) by producing either cohesive bonds or adhesive bonds therebetween at each of said interface junction means indicated by the reference numeral 88, which is also intended to specifically designate such bonds.

Also, the above-mentioned bonds comprising the interface junction means 88 may take the form of a plurality of mechanically fastened bond means including bond means produced by auxiliary fasteners of a structural type, bond means produced by auxiliary adhesive means, and bond means produced by solvent means whereby to effect cohesive bonding, or any substantial equivalent thereof, all of which are intended to be specifically designated by the reference numeral 88.

Figures 12, 13, 14, 15, 16, 17, 17A, 18, 19, 20:
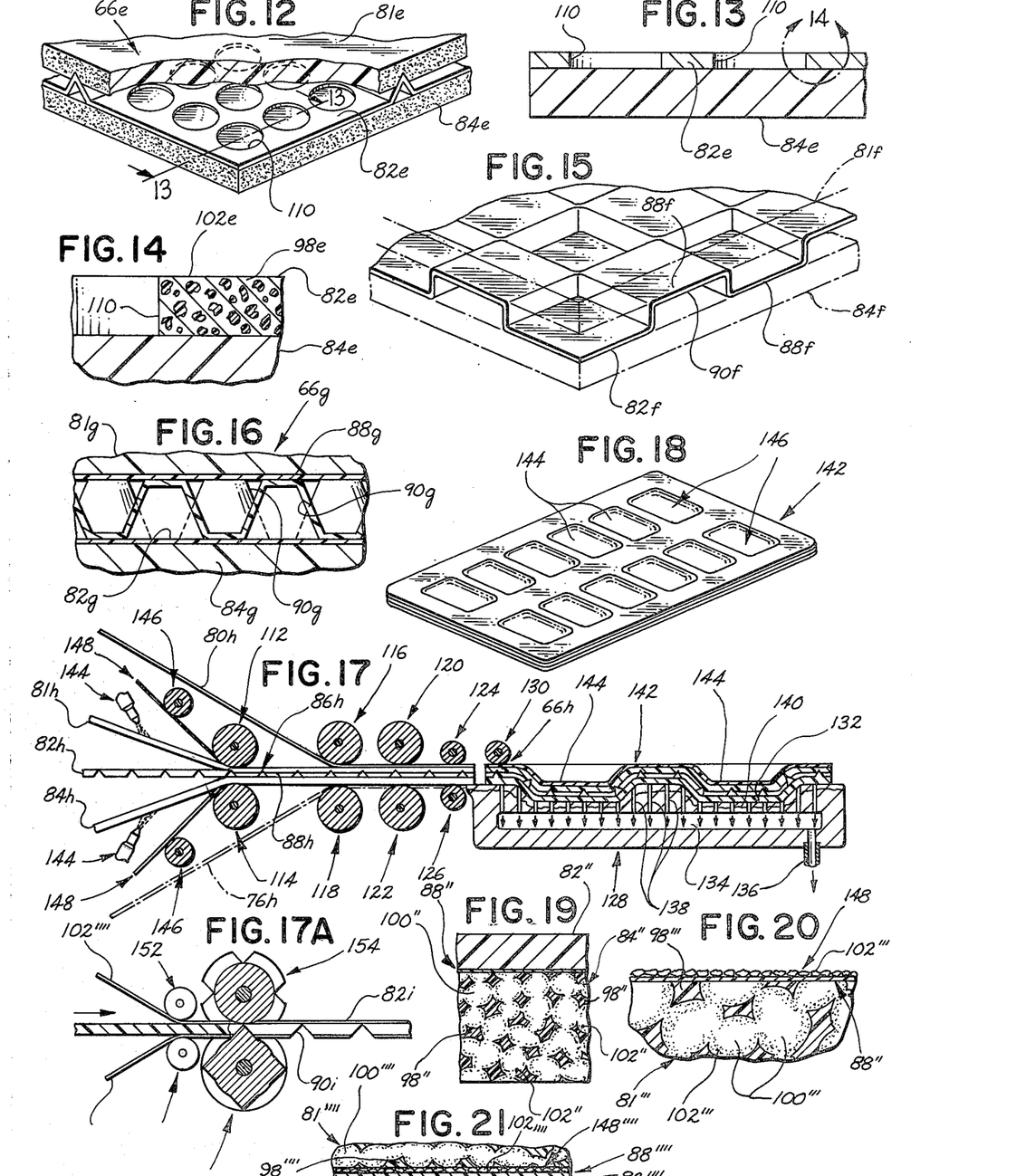
FIG. 12 is a fragmentary partially broken-away view similar in certain respects to FIG. 2, although drawn to a smaller scale, and illustrates a form of the laminated panelling material wherein the intermediate stiffening sheet or layer of material is provided with size-reducing apertures or cut-outs which do not appreciably reduce the strength of the composite multi-phase laminated material, but do substantially reduce the weight thereof, thus increasing the strength-to-weight ratio.
FIG. 13 is a fragmentary, partially broken-away, enlarged, sectional view taken substantially along the plane and in the direction indicated by the arrows 13—13 of FIG. 12. However, it should be noted that only the stiffening sheet is shown in this view. The other layers of the composite multi-phase material are removed from this view for drawing simplification reasons.
FIG. 14 is an enlarged fragmentary detailed sectional view of just that portion of FIG. 13 enclosed in the circle designated by the arrow 14 in FIG. 13 and illustrates one specific, and exemplary, type of material of which the stiffening layer or sheet may be fabricated.
FIG. 15 is a view of aspect generally similar to FIG. 12 but illustrates another modification of the stiffening layer or sheet wherein it has a plurality of adjacent, oppositely directed, sub stantially rectangular, projecting contact and engagement surfaces adapted to be bonded to adjacent layers of the foam material, only the lower one of which is shown in phantom in FIG. 13, although it should be understood that normally there will be a similar upper layer of foam material also bonded to said intermediate stiffening sheet edge to form the multi-layer, multi-phase composite laminated panelling material.
FIG. 16 is an enlarged fragmentary cross-sectional view illustrating a further modification of the intervening stiffening sheet or layer of material.
FIG. 17 is a side view, largely in section and of a somewhat diagrammatic and fragmentary nature, illustrating one typical arrangement for producing the laminated panelling material of the present invention and also illustrating immediately thereafter the forming and shaping of a particular exemplary article of manufacture from the laminated panelling material—in the arrangement illustrated by vacuum forming, although not so specifically limited.
FIG. 17A is a fragmentary view illustrating, in incomplete form, a modified input to the laminating apparatus shown at the left side of FIG. 17 and comprising means for producing the convolutions in the stiffening sheet.
FIG. 18 illustrates in perspective one exemplary representative form of article which can be made of the laminated panelling material of the present invention in the manner illustrated in FIG. 17 and comprising a sheet of the laminated panelling material having a plurality of object-receiving recess portions formed therein.
FIG. 19 is a greatly-enlarged fragmentary simplified and somewhat symbolic diagrammatic sectional view of a portion of the laminated panelling material illustrating one representative form of inclusion of a combustion-inhibiting agent.
FIG. 20 is a view similar to FIG. 19, but illustrates a slight variation of the mode of inclusion of the combustion-inhibiting agent.

The continuous-flow process of forming the laminated panelling material of the present invention illustrated in FIGS. 17 and 18 is shown as taking a particular exemplary form suitable for the production of shaped sheeting which can comprise container portions having multiple recess portions formed therein. However, it should be clearly understood that the process shown in FIG. 17 can be just as well adapted to produce laminated panelling material of the type shown in FIGS. 1-4 and not having such recesses formed therein, and the subsequent detailed description of the process shown in FIG. 17 is to be construed as inclusive of the production of building panelling means portions of the type illustrated in FIGS. 1-4 also.

The outer protective layer 76 shown in FIG. 2 can be attached adhesively, cohesively, mechanically, or can be thermally baked in place or otherwise cured after application, if desired. This is also true of the inner facing layer 80.

Figures 7, 8, 9, 10, 11:
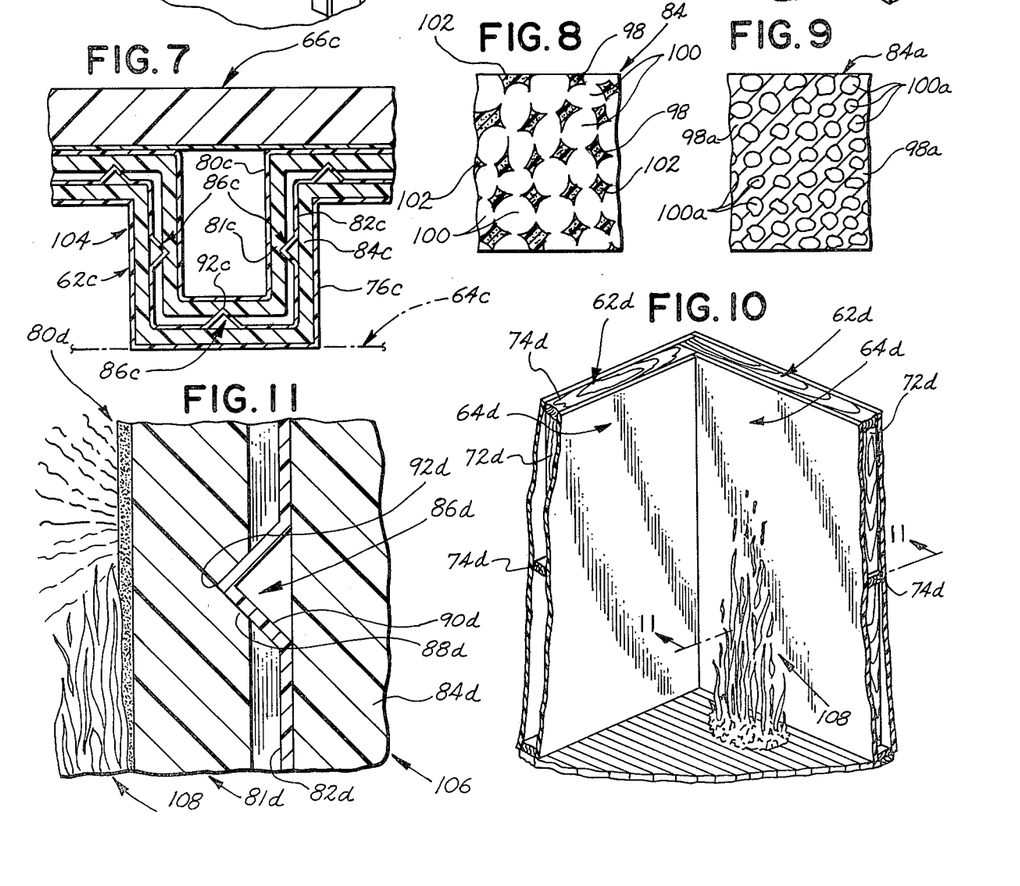
FIG. 7 is an enlarged, cross-sectional view taken substantially along the plane and in the direction indicated by the arrows 7—7 of FIG. 6 and more thoroughly illustrating the fact that, in this novel form of the invention, the structural members of the building are, in effect, also formed of the novel laminated material of the present invention.
FIG. 8 is a greatly enlarged, cross-sectional view representative of one kind of foam material adapted for use in forming the laminated panelling material of the present invention.
FIG. 9 is a view similar to FIG. 8, but illustrates a modified form of the effectively multi-phase foam material which may be employed in forming the composite laminated, high strength-to-weight ratio panelling material of the present invention.
FIG. 10 is a view similar in certain respects to FIG. 1, but illustrates a form of the composite panelling material used as a building structural panel which is of a substantially fire-resistant, fire-retardant, or fire-proof nature.
FIG. 11 is a greatly enlarged, fragmentary, cross-sectional view taken substantially along the plane and in the direction indicated by the arrows 11—11 of FIG. 10.

FIG. 8 illustrates one exemplary form of the foam material comprising the layer 84 (and/or the layer 81, although not so limited) wherein it consists of foam material including a matrix portion 98 of plastic material, or the like, having a plurality of communicating cells 100 dispersed through the plastic matrix 98 and also having a finely divided filler and extender material and characteristic-modifying means, indicated at 102, disseminated throughout the plastic matrix 98. This type of filler, extender, and characteristic-modifying means may comprise some relatively lightweight, inexpensive, normally surplus material such as sawdust or various normally unused wood by-products, shells or hulls of nuts, various normally unused cellulosic by-products or fibrous means and/or fire-proofing means comprising particles of a chemical constitution such that, when heated to a temperature in excess of a predetermined temperature, said fire-proofing means will produce a fire or flame retarding, suppressing, or extinguishing gas, or the like. Indeed, a great variety of different types of filler or characteristic-modifying particles 102 may be employed, with the selection being predicated almost entirely upon the characteristics desired of the final composite laminated panelling material.

FIG. 9 is a fragmentary view similar to FIG. 8, but illustrates a modification of the representative foam layer such as either of the foam layers shown at 81 and 84 in FIG. 4, for example. In the FIG. 9 modification, parts similar to those shown in FIG. 8 are designated by similar reference numerals, followed by the letter "a", however, and it will be noted that the major difference is the fact that the cells 100a are illustrated as being of the non-communicating type and that the plastic matrix 98a is illustrated in FIG. 9 as not carrying additional particles of filler, extender, and/or characteristic-modifying means such as that shown at 102 in FIG. 8. However, it should be clearly understood that the FIG. 8 version may be of the non-communicating-cell type, the FIG. 9 version may be of the communicating-cell type, and either version may have additional filler particles such as shown at 102 in FIG. 8, and that all such modifications are thought to be effectively disclosed by the showings of FIGS. 8 and 9 considered in conjunction with the foregoing clarifying description and are intended to be included and comprehended within the broad scope of the present invention. Furthermore, it should be understood that in subsequent descriptions of various other forms of the invention, the foregoing remarks are equally applicable and the subsequently described disclosures of said other forms of the invention are to be so considered.

FIG. 4A is a fragmentary view similar to FIG. 4, but illustrates a very slight modification of the invention, and similar parts are designated by similar reference numerals, followed by the letter "b", however. The major difference of this modification is the fact that each of the convolutions 90b terminates in a flat outer contact surface rather than being angularly shaped as shown in FIG. 4. Otherwise, the construction of this modification is substantially the same as that of the first form of the invention previously described.

Figures 5, 6:
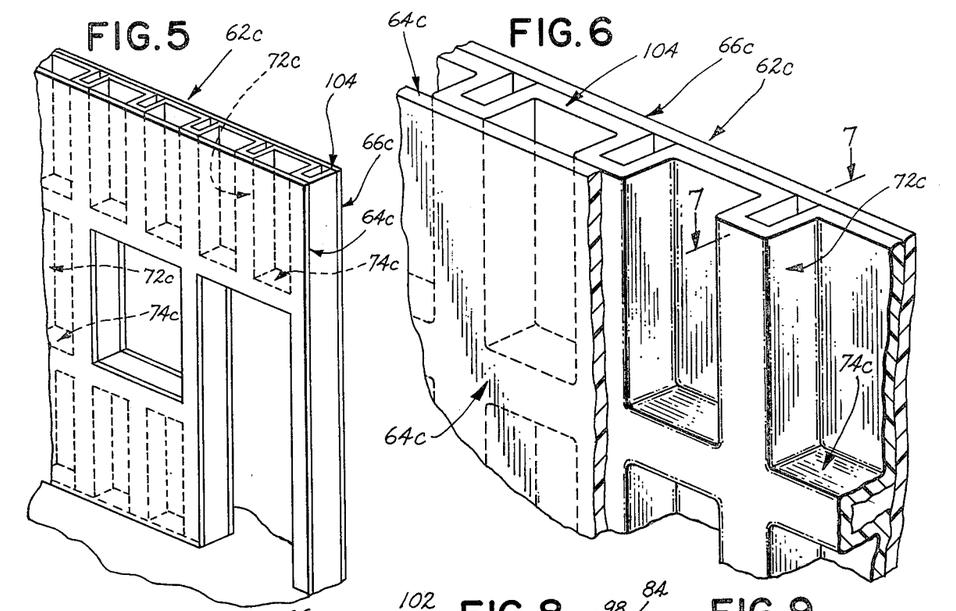
FIG. 5 is another view of a certain representative type of building construction employing the novel high strength-to-weight ratio laminated panelling material of the present invention.
FIG. 6 is an enlarged, fragmentary, partly broken-away view generally similar to an upper portion of FIG. 5.

FIG. 5 is a fragmentary, partially broken-away, perspective view generally similar to a right portion of FIG. 1 in aspect, but including door and window openings and illustrating a modified type of the structural panel means portions made of the novel laminated panelling means of the present invention which is so molded and shaped as to define surface wall portions and also intervening structural members. Parts of this modification functionally or structurally similar to the first form of the invention are designated by similar reference numerals, followed by the letter "c", however. The inner surface wall portion 64c may be of the laminated panelling material of the present invention or of any other desired material. The outer wall portions 66c may also be of the laminated panelling material of the present invention or of any other desired material. However, positioned between said inner and outer walls is a formed sheet of the multi-layer, laminated panelling means of the present invention which may be referred to as an intermediate wall and which is generally designated by the reference numeral 104 and which has formed therein at appropriately vertically and horizontally spaced locations the structural member portions 72c and 74c which functionally correspond to the 2×4's or other types of structural members shown at 72 and 74 of the first form of the invention, but which, in this case, are integrally formed in the intermediate wall 104 made of the novel laminated panelling material of the present invention.

The inner and outer walls 64c and 66c may be attached to the intermediate wall 104 cohesively, adhesively, mechanically by auxiliary fasteners, mechanically by physically interfitting portions, or otherwise.

FIGS. 10 and 11 illustrate a further modification and similar parts thereof are designated by similar reference numerals, followed by the letter "d", however. In this modification, the inner wall 64d of the structure fragmentarily shown and generally designated by the reference numeral 106 is of a special type wherein the laminated panelling material is of substantially the same form as previously described except for the fact that it has an inner coating 80d which comprises fire-resistant, fire-retardant, and/or fire-extinguishing material which may be of the same type as previously described in connection with the characteristic-modifying particles 102 of the FIG. 8 showing of the first form of the invention, although in the form illustrated in FIGS. 10 and 11, said anti-fire material comprising the layer 80d is present in great concentration along the surface thereof which might be exposed to flames, such as those indicated at 108, for example. The remainder of the structure 106 may be made of other layers of similar laminated panelling material and conventional structural members or integral structural members of the type illustrated in FIGS. 5-7, for example, if desired. Otherwise, this modification is similar to previously described forms.

FIGS. 12, 13, and 14 illustrate a further modification of the laminated panelling material, and similar parts are designated by similar reference numerals, followed by the letter "e", however. In this modification, the laminated panelling means portion 66e is quite similar to the panelling means portion shown at 66 in FIG. 2, but has a modified inner or intermediate stiffening sheet 82e, in that it is provided with weight-reducing cut-outs 110 which function in two ways. They reduce the weight of the stiffening sheet 82e without substantially reducing its strength—particularly when in the bonded, multi-layer, composite laminated panelling means portion 66e, but, in addition, the cut-outs 110 actually allow the two oppositely positioned foam sheets 81e and 84e to penetrate through the cut-outs 110 and be joined to each other, thus enhancing the overall bonding of the multi-layer, laminated panelling material.

FIG. 13 merely illustrates in enlarged form the appearance in side section of the modified stiffening sheet 82e, while FIG. 14 further illustrates in detailed cross-section just that portion of the modified stiffening sheet lying within the broken-line circle designated by the arrow 14 in FIG. 13 and shows it as being of the same general type of material (except non-cellular in the form shown) as that illustrated in FIG. 8 and previously described in detail although it should be clearly understood that it could be of the FIG. 9 type or various of the characteristics of the FIGS. 8 and 9 type may be selectively interchanged in the FIG. 14 version as previously described.

FIG. 15 is a fragmentary view partly in phantom and with the top foam layer removed entirely and is of aspect similar to FIG. 2, but illustrates a further modification of the invention. Therefore, similar parts are designated by similar reference numerals, followed by the letter "f", however. In the FIG. 15 modification, the major difference from the FIG. 2 form of the invention is the shape of the oppositely extending convolutions 90f, which, in this case, are rectangularly shaped and extend perpendicularly from the intermediate or central plane to the outer contact plane defining the interface junction means 88f, thus maximizing the area of each such interface junction means 88f. While the upper foam layer, similar to that shown at 81 in FIG. 2, is not shown in FIG. 15, but merely has its contact surface indicated by the phantom line bottom surface thereof as indicated at 81f, and while the bottom foam layer 84f is similarly indicated in phantom lines, it should be understood that this is done merely for drawing simplicity and that the structure is similar to that shown in FIG. 2, althrough it may be modified within the scope of the disclosures of the various other modifications of the invention illustrated and described herein.

FIG. 16 is a view similar to FIGS. 4 and 4A, but illustrates a further slight modification and, therefore, similar parts are designated by similar reference numerals, followed by the letter "g", however. In this modification, it will be noted that the major difference from the FIG. 2 form of the invention is the fact that the convolutions 90g are of frusto-conical shape, thus providing a plurality of circular, flat, contact portions defining similar circular interface junction means 88g dispersed and disseminated over the area of the complete laminated panelling means portion fragmentarily shown in FIG. 16 and generally designated by the reference numeral 66g. Otherwise, this modification is similar to previously described forms of the invention.

FIG. 17 is a side sectional view of a somewhat fragmentary diagrammatic type illustrating one exemplary and non-specifically-limiting process for manufacturing the laminated panelling means of the present invention and also illustrating the immediately subsequent forming and shaping of the composite bonded, multi-layer laminated panelling means into one of many possible different types of articles of manufacture which may be formed therefrom and which, in the example illustrated, comprises a container portion for a multi-recess protective container and packaging means adapted to receive, protect, and store relatively small packageable objects. Part which are similar to previously described parts are designated by similar reference numerals, followed by the letter "h", however. It will be noted that the multiple-layer laminating apparatus shown fragmentarily and diagrammatically at the left side of FIG. 17 comprises one exemplary and non-specifically-limiting form of laminating or bonding apparatus and, as illustrated, comprises a first pair of input, heated pressure rollers, indicated at 112 and 114, followed by a second pair of heated pressure rollers, 116 and 118, and the two subsequent pairs of similar pressure rollers 120-122 and 124-126 which function to continue to apply pressure and heat to the multi-layer laminated panelling means for a sufficient period of time to produce a very firm and positive bonding between the multiple layers thereof. However, it should be clearly understood that the laminating process is not limited to the specific numbers of pairs of heated pressure rollers illustrated in FIG. 17 which is merely illustrative of one exemplary such laminating process.

It will be noted that the initial pair of heated pressure roller 112 and 114 receive therebetween in a continuous-flow manner the convoluted stiffening layer of structural formed material 82h and also receive, on each side of the stiffening layer 82h, the two foam layers 81h and 84h in a manner such that the heat and pressure applied between the initial pair of heated pressure rollers 112 and 114 forms the bonded interface junction means 88h similar to those previously described and better illustrated at 88 in FIG. 4 of the first form of the invention. In other words, the bonding or laminating of the adjacent portions of the adjacent sheets 82h, 81h, and 84h at each such interface junction means 88h is effected by the application of heat and pressure applied thereto by the opposed rollers 112 and 114. Then the bonded three layers exiting from the right side of the first opposed pair of heated pressure rollers 112 and 114 passes between the second pair of opposed heated pressure rollers 116 and 118 and at that location the two outer layers 80h and 76h are effectively bonded and joined to the corresponding outer surfaces of the foam layers 81h and 84h, respectively, as a consequence of the applied heat and pressure. The subsequent pairs of heated pressure rollers 120 and 122 and 124 and 126 merely act to further enhance the bonding between the various different layers of the laminated panelling means indicated generally at 66h.

The right portion of FIG. 17 illustrates a vacuum-forming apparatus, generally designated by the reference numeral 128, adapted to receive laminated panelling material or means such as that shown at 66h and produced by any form of laminating apparatus such as the exemplary but non-specifically-limiting form thereof illustrated at the left side of FIG. 17.

The received laminated panelling material 66h is adapted to pass under an initial clamping roller 130 which is of a movable type adapted to be moved sufficiently to allow the introduction of the laminated panelling means thereunder and into a position overlying the vacuum-forming apparatus 128 and to then be moved downwardly into a clamping position. However, various other clamping means may be employed and a multiplicity of same may be appropriately positioned around the periphery and at various spaced locations with respect to the vacuum-forming apparatus 128 so as to both positively hold corresponding portions of a blank of laminated panelling means 66h in place across the top of the vacuum-forming apparatus 128 and also to effectively edge-seal same so as to maximize the effectiveness of the vacuum applied to the bottom surface of the blank of laminated panelling means 66h during the vacuum-forming process illustrated in the right half of FIG. 17.

The vacuum-forming and molding apparatus 128 is shown as comprising a lower mold or die face 132 shaped so as to have a configuration corresponding to the shape desired for the article of manufacture to be vacuum-formed thereagainst and further includes a lower vacuum chamber 134 and a vacuum inlet 136 to which a vacuum pump (not shown since such are well-known in the art) may be connected for producing a desired degree of suction in the vacuum chamber 134 during the vacuum-forming process. The mold face 132 is provided with a plurality of small vacuum-transmitting apertures 138 connected between the vacuum chamber 134 and the upper or forming face of the mold 132. Thus, it will be understood that when vacuum is applied through the vacuum inlet 136 to the vacuum chamber 134, said vacuum is also applied through the multiple vacuum apertures 138 to virtually the complete bottom surface of the blank of laminated panelling material 66h positioned over the mold face 132, while atmospheric pressure is applied to the opposite or top surface thereof. This, taken in conjunction with the heating of the laminated panelling material provided by the representative, but non-specifically-limiting, heating means 140, causes the blank of laminated panelling material 66h positioned above the mold face 132 (and normally lying in a substantially flat horizontal plane thereacross and partially spaced upwardly therefrom) to be forcibly deflected and formed downwardly into contact with the complete surface of the mold face 132 and to assume said new configuration permanently so that, upon release of the vacuum, the formed article of manufacture, which is generally designated by the reference numeral 142, can be removed from the vacuum-forming apparatus 128 and will have the appearance best shown in FIG. 18, in the exemplary but non-specifically-limiting arrangement illustrated, wherein said vacuum-formed article of manufacture made of the novel laminated panelling material of the present invention comprises the protective packaging or container portion also generally designated by the reference numeral 142, which will be described in greater detail hereinafter in connection with FIGS. 18-20.

The exemplary laminating apparatus shown at the left side of FIG. 17 is of course provided with means for heating the various pressure rollers and also with means for applying a desired amount of pressure to the layers of the panelling material to be laminated and bonded therebetween. Also, means for adjusting the spacing between the pressure rollers is provided and drive means for driving all of the pressure rollers in a synchronized manner in the directions indicated by the curved arrows is also provided. None of these means is shown in FIG. 17 for reasons of drawing simplicity, and since all such means are well-known in the art and do not touch upon the real inventive concept of the present invention.

Incidentally, it should also be noted that various other laminating processes may be employed in lieu of the exemplary one fragmentarily illustrated and may comprise means for applying adhesive to the interface junction means 88h or for applying plastic solvent thereto whereby to produce in the case adhesive bonding and, in the second case, cohesive bonding thereof. Also, other forms of heating and/or pressure-applying means may be employed and may comprise partial rollers or wheels for applying heat and pressure along joining lines of a longitudinal type and not extending transversely across the panelling material layers. Said heat and/or pressure-applying means may also be provided with means for moving same relative to the longitudinally moving panel material sheets so as to produce any desired pattern of junction lines and interface junction means 88h. Additionally, means, such as laser beams in any desired pattern or arrangement, may be employed and may be moved transversely if desired during longitudinal movement of the multiple layers to be laminated together so as to produce any desired pattern of interface junction means. Additionally, heat may be applied to the multiple layers by means other than exterior heat applicators such as the heated pressure rollers shown in FIG. 17 and, in certain forms, may comprise means for effectively heating interior portions of the multiple layers very rapidly in order to maximize the efficiency and speed of the internal bonding of adjacent layer surfaces to each other. One such heating means might comprise electrostatic heating means so tuned as to have a proper load factor at the interface junction means as to maximize the heating at said locations whereby to make it possible to produce the laminated panelling means 66h at high speed. One means for doing this is to feed a layer of junction material between each of the layers shown at the left side of FIG. 17 and which are to be bonded together and with said junction layers having a different load factor, and electrostatic high-frequency heating loading characteristic, such that when electrostatic heating of an appropriate and corresponding frequency is applied across the complete plurality of layers of material to be bonded, the junction layers in the interface junction regions will become heated much more rapidly than the rest of the material and will rise to temperatures much higher than the adjacent layers of material, thus causing very effective and positive area-coextensive bonding and laminating of all of the so-treated interface junction regions.

The representative forming apparatus shown at 128 may also be modified substantially, as a vacuum-forming apparatus and, furthermore, is not limited to this particular type of forming. Even when it comprises a vacuum-forming apparatus, the upper mold face 132 may be separable and interchangeable from the rest of the mounting structure so that the shape of the article of manufacture to be vacuum-formed can be changed at will. Additionally, the mold face 132 may have one or more mold insert positions for changing the size and/or shape of the recesses to be vacuum-formed. Additionally, the forming apparatus may have a top enclosure and chamber and be arranged to have pressure applied thereto while the vacuum is applied to the other surface so as to further enhance the molding process and extend its range of molding efficiency and capability. Additionally, there may be two opposed die faces and two opposed chambers arranged to alternately have vacuum applied to one side and pressure applied to the opposite side and then the reverse thereof in a cyclic arrangement for further increasing the molding capability and efficiency of the apparatus. All such arrangements, and a variety of other types of molding, shaping, and forming apparatuses, may be employed in lieu of the exemplary vacuum-forming apparatus shown at 128 and are intended to be included and comprehended within the broad scope of the present invention.

FIG. 17A is a fragmentary view which shows a very slight modification of the exemplary, but non-specifically limiting laminating apparatus shown at the left side of FIG. 17 and comprises means for forming the convolutions in the intermediate stiffening sheet shown at 82h in FIG. 17, which merely takes the form of an additional pair of vertically spaced heated pressure rollers 154 and 156 adapted to be located at the extreme left end of the complete laminating apparatus shown in FIG. 17 and to receive therebetween the stiffening sheet 82i therebetween in a flat form without convolutions and to form the convolutions 90i thereon by reason of the application of heat and pressure thereto just prior to the feeding of the convoluted stiffening sheet 82i between the first pair of opposed rollers, such as shown at 112 and 114 in FIG. 17. In other words, FIG. 17A is just a fragmentary input modification of the FIG. 17 form of laminating apparatus wherein both the forming and bonding of all of the sheets of material which are to be laminated is done by the laminating apparatus.

Incidentally, it should be noted that all that has been said hereinbefore with respect to the use of various heated pressure rollers and wheels, the transverse movement thereof to produce a desired bonding pattern and all that has been said hereinbefore with respect to the use and application of adhesive bonding means and the production of cohesive bonding means in various desired patterns, and all that has been said with respect to the use of laser means for this purpose may be considered to the applicable to the forming of any desired pattern of the convolution 90i on the intermediate stiffening sheet 82i.

FIG. 2A illustrates a slight modification of the intermediate stiffening sheet of the first form of the invention, and, therefore, parts which are structionally or functionally similar or equivalent to the corresponding parts of the first form of the invention are designated by similar reference numerals, primed, however. However, as shown in FIG. 2A, the intermediate stiffening sheet 82' is of a type having the convolutions 90' extending both upwardly and downwardly from a central portion of the intermediate stiffening sheet 82', whereas in the first form of the invention shown in FIG. 2 the small triangular convolutions 90 extend upwardly while the larger substantially rectangular portions of the stiffening sheet 82 which may be said to effectively comprise, convolutions also, extend downwardly. Both arrangements, and a great variety of effectively equivalent arrangements, are also intended to be included and comprehended within the board scope of the present invention.

In the solid line arrangement illustrated in FIG. 2A, the oppositely directed convolutions 90' are solid and thus the stiffening sheet 82' is effectively of varying thickness. This requires that said sheet 82' be molded or formed in a manner such as to be capable of producing such a sheet of varying thickness, as opposed to the very simple forming operation required for producing the type of stiffening sheet shown at 82 in FIG. 2. However, it is also possible to form a construction such as that shown in part in broken lines in FIG. 2A, wherein the stiffening sheet 82' actually comprises two superimposed individual stiffening sheets each of which is of substantially constant thickness throughout, and each of which is formed into a sheet of the general type of that shown at 82 in FIG. 2. However, the two stiffening sheets are positionally reversed, as shown in broken lines in FIG. 2A, so that the convolutions 90' extend in both directions. If desired, two such stiffening sheets may be joined along the junction plane J by placing suitable adhesive or cohesive bonding material there-along and by applying appropriate heat thereto to effect a firm bonded junction along the junction plane J. This may be accomplished in any of a variety of ways and is particularly suitable to being produced by the use of high frequency electrostatic heating applied across the laminated panelling material 66' and so arranged relative to the loading factor and load characteristics of the junction material positioned along the junction plane J as to maximize and concentrate the electrostatically produced heating along said junction plane such as to produce a firm bonding (and, in certain cases, curing) of such a junction between the two sheets of such a two-sheet form of such an intermediate stiffening member 82'.

The position of each such bottom convolution and the plane in which it would end are indicated, respectively, in broken lines at 90 and 92 in FIG. 4, although it should be clearly understood that such downwardly triangular convolutions are not present in FIG. 4 of the present invention. This has been done to merely avoid the necessity of providing another figure similar to FIG. 4 merely to illustrate the position of the bottom convolutions of the FIG. 2A version.

This alternate mode of construction may also be adapted to the type of construction illustrated fragmentarily in FIG. 4A and, indeed, to any of the other various types of construction of the multi-layer laminated panelling means illustrated in any of the other figures of the drawings and described elsewhere herein.

While one representative preferred form of the invention is provided with combustion-inhibiting means carried by or adjacent to the low-density high-specific-volume filler material (taking the form of an expanded body of plastic foam material in one preferred representative form) and comprising a quantity of a heat-responsive combustion-inhibiting agent adapted to decompose when subjected to heat in excess of a predetermined magnitude whereby to either prevent or substantially inhibit combustion and to thus also prevent or substantially inhibit the consequent production of noxious gasses or fumes as a consequence of such combustion. This preferred form of the invention providing for the inclusion of such a combustion-inhibiting agent does not lend itself to being shown in the type of relatively small-scale drawings which have been previously described, and, thus, are specifically illustrated in the three greatly-enlarged, fragmentary, simplified and somewhat symbolic diagrammatic sectional views comprising FIG. 19, FIG. 20 and FIG. 21, with the major difference between each of said figures being the location of the combustion-inhibiting agent and its relationship to the laminated panelling material.

In FIG. 19, the combustion-inhibiting agent is indicated by the reference numeral 102" and it is shown in the representative arrangement illustrated in FIG. 19 as comprising a solid material in particulate form in disseminated locations throughout the expanded body of foam material 81" (which shall also be considered as being applicable to the other expanded body of foam material corresponding to that shown at 84 of the first form of the invention) and within the interiors of the plurality of hollow cells 100". In the FIG. 19 form, the combustion-inhibiting agent 102" preferably comprises a halogenated compound such as carbon tetrabromide or carbon tetraiodide, or the like, such as to be adapted to produce, when subjected to the heat of combustion, a fire-extinguishing gas comprising a halogen, preferably of a type containing a substantial quantity of bromine, said combustion-inhibiting agent being of a particular type of material known as a Halon as specifically defined in the paragraph immediately following.

A Halon as referred to in the preceding paragraph is a halogenated compound that contains one or more atoms of an element from the Halogen series. When hydrogen atoms in a hydrocarbon compound, such as methane or ethane, are replaced with Halogen atoms, the chemical and physical properties of the resulting compound are markedly changed. Methane, for example, is a light flammable gas. Carbon tetrafluoride is also a gas, chemically inert, non-flammable and extremely low in toxicity. Carbon tetrachloride is also an effective fire-extinguishing agent, as are carbon tetrabromide and carbon tetraiodide, which are solids that decompose easily under heat. The presence of fluorine in the compound increases its inertness and stability, while the presence of other halogens, particularly bromine, increases the fire-extinguishing effectiveness of the Halon. The Halons referred to include five fire-extinguishing agents: Halon 1011, bromochloromethane ($CH_2BrCl$); Halon 1211, bromochlorodifluoromethane ($CBrClF_2$); Halon 1202, dibromodifluoromethane ($CBr_2F_2$); Halon 1301, bromotrifluoromethane ($CBrF_3$); and Halon 2402, dibromotetrafluoroethane ($CBrF_2CBrF_2$).

FIG. 20 is similar to FIG. 19 and similar reference numerals are used to designate similar parts but are triple-primed. In FIG. 20 the major difference from FIG. 19 is the fact that the combustion-inhibiting agent 102''' is effectively provided in layers closely adjacent to and in area-coextensive relationship with response to the expanded body of foam material 81''' (which shall also be considered as being applicable to the other expanded body of foam material corresponding to that shown at 84 of the first form of the invention).

FIG. 21 is almost identical to FIG. 20, but merely shows a slight difference with respect to the location of the combustion-inhibiting agent which in this case, is designated by the reference numeral 102'''' and which is shown as lying primarily in the region of said interface junction means 88''''.

It should be understood that each of the just-described fingers 19, 20 and 21 is intended to show a different representative, but non-specifically limiting, arrangement for the inclusion of the combustion-inhibiting agent, but that the concept is broader than the specific showings of said three figures and includes various ways of including it, either in particulate solid or liquid form and either evenly disseminated throughout or locally concentrated at various selected and usually dispersed locations. Also, the representative type of combustion-inhibiting agent may be modified so as to include various other functional equivalents.

The means for positioning the combustion-inhibiting agent in the three different representative but non-specifically limiting forms shown in FIG. 19, FIG. 20 and FIG. 21 may assume a variety of forms, all within the broad scope of the present invention. In other words, the disseminating of the combustion-inhibiting agent 102" in the FIG. 19 example may comprise the dipping of either or both (usually both) of the foam layers 81" and the other one corresponding to that shown at 84 of the first form of the invention into an applying region such as a liquid carrier having a plurality of the particles of the combustion-inhibiting agent either in solution or in suspension or in the form of a slurry so that when dried the particles of the combustion-inhibiting agent 102" will be disseminated throughout the foam material and within the interiors of the plurality of hollow cells 100". Of course, suitable spray type applicators may be located at appropriate regions such as indicated in broken lines at 144 of FIG. 17 or on the opposite sides of each of the two foam layers 81h and/or 84h for direct spray type pressurized application of the combustion-inhibiting agent 102" to either or both sides of either or both of the foam layers. This may be done with the combustion-inhibiting agent 102" being either in a liquid as mentioned above or in particulate or powdered dry form.

The FIG. 20 variation of the location of the combustion-inhibiting agent 102''' may be provided by actually feeding a layer of same, as indicated in greatly reduced size and in broken lines at 146 for the feed roller and 148 for a solid sheet of the combustion-inhibiting agent 102''', which it is understood may be positioned on either or both sides of either or both of the foam layers 81h and/or 84h of FIG. 17. This is merely representative and the sheet-like positioning of the combustion-inhibiting agent 102''' in FIG. 20 may be accomplished in any of various other suitable and/or substantially equivalent ways.

The slightly different positioning of the combustion-inhibiting agent 102'''' as shown in FIG. 21 may be accomplished in one representative manner, as indicated in broken lines on the input side of FIG. 17A where a pair of feed rollers 150 are arranged to feed two sheet-like layers of the combustion-inhibiting agent 102'''' into the so-called interface region on either side of the intermediate stiffening layer 82i of FIG. 17A. Of course, it should be understood that said layers may be used conjointly or either of same may be used alone and that various other substantially equivalent means and ways of applying same may be used and lie within the broad scope of the invention.

For the purpose of language clarity, please note that the word, "halon" has been defined to mean a halogenated compound of the type which may be said to comprise a halogenated hydrocarbon, that the term "panelling means" and "layer means" is intended to mean either "panel" or "panels" and the term "layer means" is intended to mean "layer" or "layers" while the term "interface junction means" is intended to mean "bond" or "bonds" throughout the specification.

Numerous modifications of construction and/or materials will be immediately apparent to those skilled in the art and are intended to be included within the scope of the present invention, which is further intended to include all forms of the invention lying within the scope of the appended claims.

What is claimed is:

1. A decorative and structural panel having a large magnitude strength-to-weight ratio comprising: a plurality of laminated panelling material layers firmly bonded together at a plurality of area-spaced, area-disseminated, multi-point interface attachment and junction locations, said plurality of layers of laminated panelling material including at least one convoluted, weight-reducing, strength-increasing, stiffening layer of structural, formed material having a plurality of convolutions extending transversely from a surface plane thereof, said convolutions having outer contact surface portions in contact with corresponding surface portions of a next adjacent layer, at least said convoluted layer being made of a formable thin sheet of high strength material, said laminated panel further including at least one low-density, high specific volume, expanded, compressible, foam filler material layer containing and surrounding a plurality of hollow cells, said foam filler material having a maximized volume-to-weight ratio and carrying a fire extinguishing agent comprising a halogenated compound in particulate form, said halogenated compound being decomposable when subjected to the heat of combustion and adapted to produce, as a result of decomposition, a fire extinguishing gas.

2. An article of manufacture as defined in claim 1, wherein said convoluted, weight-reducing, strength-increasing, stiffening layer of said laminated panelling material layers is made of plastic formed with said plurality of convolutions integral therewith and having a desired directional pattern for imparting desired directional strength-maximizing characteristics to the composite laminated panelling material layers.

3. An article of manufacture as defined in claim, 1, wherein said convoluted, weight-reducing, strength-increasing, stiffening layer of said laminated panelling material layers is made of plastic formed with said plurality of convolutions integral therewith and having a desired multi-directional pattern for imparting desired multi-directional strength-maximizing characteristics to the composite laminated panelling material layers.

4. An article of manufacture as defined in claim, 1, wherein said convoluted, weight-reducing, strength-increasing, stiffening layer of said laminated panelling material layers is made of metal formed with said plurality of convolutions integral therewith and having a desired directional pattern for imparting desired directional strength-maximizing characteristics to the composite laminated panelling material layers.

5. An article of manufacture as defined in claim, 1, wherein said convoluted, weight-reducing, strength-increasing, stiffening layer of said laminated panelling material layers is made of metal formed with said plurality of convolutions integral therewith and having a desired multi-directional pattern for imparting desired multi-directional strength-maximizing characteristics to the composite laminated panelling material layers.

6. An article of manufacture as defined in claim 1, wherein said fire extinguishing agent is carried by said expanded layer of foam filler material in layer means closely adjacent to and in area-coextensive disseminated relationship with respect to said expanded layer of foam filler material.

7. An article of manufacture as defined in claim 1, wherein said fire extinguishing agent is carried by said expanded layer of foam filler material in the region of said bonding together of said layers at said junction locations.

8. An article of manufacture as defined in claim 1, wherein said expanded foam material defines and surrounds said plurality of hollow cells, which are of the interconnected and communicating type, thus providing desired hysteretic loss characteristics in addition to said maximized volume-to-weight ratio characteristic.

9. An article of manufacture as defined in claim 1, wherein said expanded foam material defines and surrounds said plurality of hollow cells, which are of the isolated and non-communicating type, thus providing desired compression characteristics in addition to said maximized volume-to-weight ratio characteristic.

10. An article of manufacture as defined in claim, 1, wherein said bonding together of said layers at said junction locations comprises thermal-induced cohesive bonds between adjacent portions of said plurality of layers of said laminated panelling material.

11. An article of manufacture as defined in claim, 1, wherein said bonding together of said layers at said junction locations comprises solvent-and-pressure-induced cohesive bonds between adjacent portions of said plurality of layers of said laminated panelling material.

12. An article of manufacture as defined in claim, 1, wherein said bonding together of said layers at said junction locations comprises adhesive joining means interpositioned between contacting adjacent portions of said plurality of layers of said laminated panelling material effectively hardened, set, and cured in place to provide a firm bond therebetween.

13. An article of manufacture as defined in claim, 1, wherein said bonding together of said layers at said junction locations comprises a plurality of mechanically fastened bond means firmly and rigidly mechanically fastening together adjacent portions of said plurality of layers of said laminated panelling material.

14. An article of manufacture as defined in claim, 1, wherein said plurality of laminated panelling material layers takes the form of a plurality of precut-to-size individual laminated panelling material layer portions so precut, sized and shaped as to be adapted to define a building structure of a predetermined plan, pattern, and shape.

15. An article of manufacture as defined in claim 14, wherein edge parts of said laminated panelling material layer portions are effectively provided with effective edge-joining mounting and assembling means for mounting a plurality of said laminated panelling material layer portions in such a predetermined relationship with respect to each other, to define such a building structure of a predetermined plan, pattern, and shape and adapted to be mounted, assembled, and placed in said predetermined relationship at a building site or location with substantially no cutting or reshaping of said laminated panelling material layer portions being required to achieve the mounting and assembling of said laminated panelling material layer portions in said predetermined relationship.

16. An article of manufacture as defined in claim 14, wherein said individual panelling material layer portions are provided with a desired type of wall-surface having desired wall-surface characteristics.

17. An article of manufacture as defined in claim, 1, wherein said fire extinguishing agent takes the form of a a halogenated hydrocarbon compound comprising carbon tetrabromide.

18. An article of manufacture as defined in claim, 1, wherein said fire extinguishing agent takes the form of a a halogenated hydrocarbon compound comprising carbon tetraiodide.

19. An article of manufacture as defined in claim, 1, wherein said bonding together of said layers at said junction locations comprises pressure-induced cohesive bonds between adjacent portions of said plurality of layers of said laminated panelling material.

* * * * *